United States Patent [19]
Daniels et al.

[11] 3,953,682
[45] Apr. 27, 1976

[54] LOOP CURRENT DETECTOR

[75] Inventors: Douglas Lee Daniels, Irvine; Garrold W. Ochs, Orange, both of Calif.

[73] Assignee: The Anaconda Company, New York, N.Y.

[22] Filed: Nov. 11, 1974

[21] Appl. No.: 522,859

[52] U.S. Cl. ................... 179/18 FA; 307/88 R; 340/253 Q
[51] Int. Cl.² ................................. H04M 3/00
[58] Field of Search ....... 179/18 FA, 18 F, 175.3 R, 179/173, 172; 340/253 R, 253 Q, 253 B; 307/88 R

[56] References Cited
UNITED STATES PATENTS

| | | | |
|---|---|---|---|
| 3,138,720 | 6/1964 | Glore | 179/18 F |
| 3,183,498 | 5/1965 | Midis et al. | 179/18 F |
| 3,390,235 | 6/1968 | Diggelmann et al. | 179/18 FA |
| 3,851,108 | 11/1974 | Freimanis | 179/18 F |

*Primary Examiner*—Douglas W. Olms
*Attorney, Agent, or Firm*—William W. Haefliger

[57] ABSTRACT

A loop current detector for detecting current flowing in a pair of telephone wires comprises:
  a. a saturable reactor having first, second and third windings, the first and second windings adapted to be connected in a loop circuit to pass DC current,
  b. resistance connected with the third winding to form therewith a voltage divider, and an oscillator having an AC output connected with the divider, characterized in that the AC voltage drop across the third winding is relatively high when no DC current flows through said loop circuit, and said drop is relatively low when DC current flows through said circuit, and
  c. switching means having first and second modes of operation with associated outputs, and connected with said voltage divider to be responsive to said oscillator output when said AC voltage drop is relatively high to be switched into said first mode of operation with one associated output, and to be non-responsive to said oscillator output when said AC voltage drop is relatively low to be switched into said second mode of operation with a second associated output.

6 Claims, 1 Drawing Figure

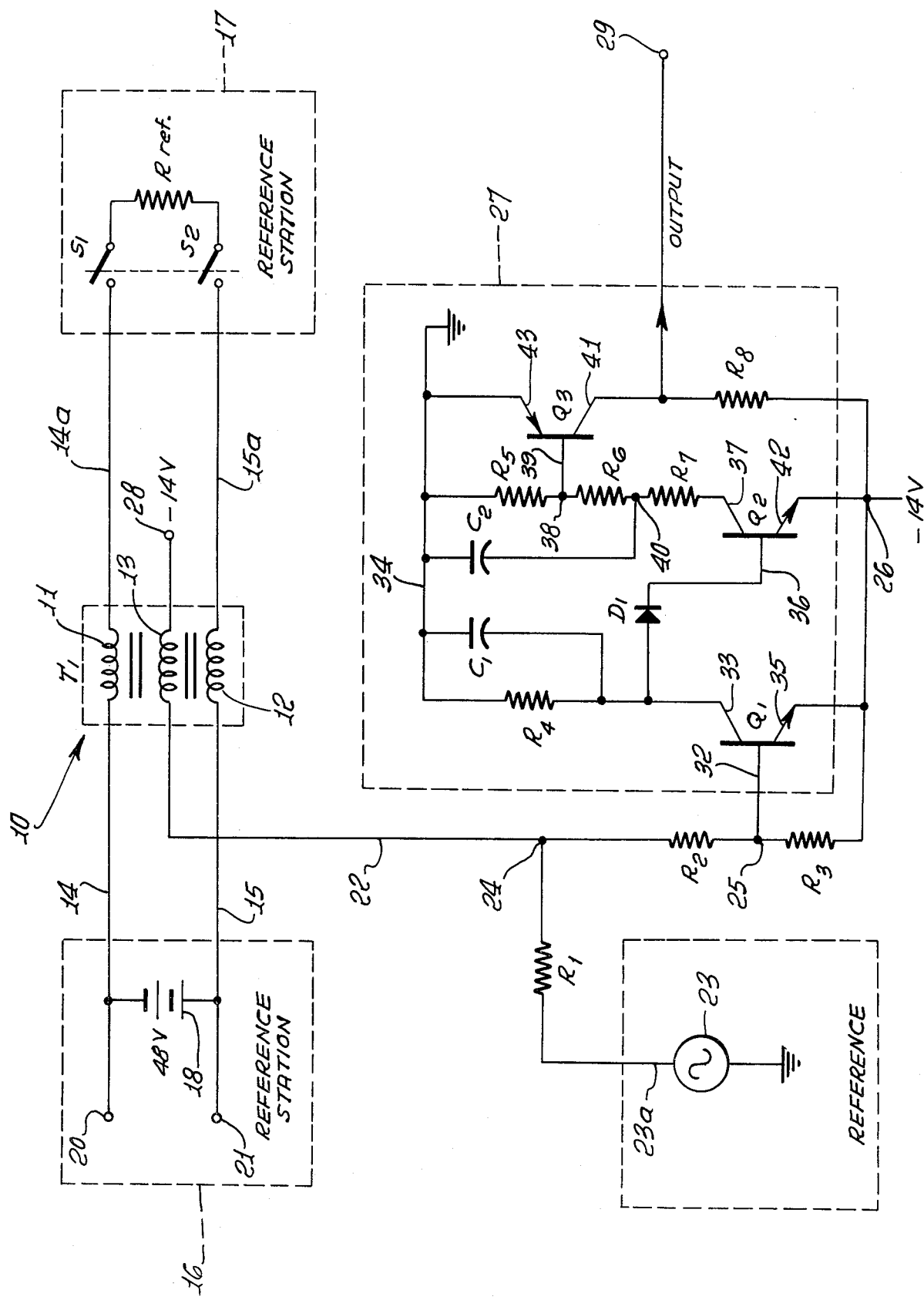

LOOP CURRENT DETECTOR

BACKGROUND OF THE INVENTION

This invention relates generally to telephony, and more particular concerns the detection of current flowing in a pair of telephone wires.

It becomes necessary, in telephone subscriber circuits, to determine when current is flowing in a pair of wires. The current detection circuit must not affect voice frequencies on the pair, and must pass high AC voltages used to ring a telephone. To our knowledge, no prior detection method provided the unusual advantages in operation and results as now afforded by the present invention, as will appear.

SUMMARY OF THE INVENTION

Basically, the loop current detector comprises:

a. a saturable reactor having first, second and third windings, the first and second windings adapted to be connected in a loop circuit to pass DC current, b. resistance connected with the third winding to form therewith a voltage divider, and an oscillator having an AC output connected with the divider characterized in that the AC voltage drop across the third winding is relatively high when no DC current flows through said loop circuit, and said drop is relatively low when DC current flows through said circuit, and c. switching means having first and second modes of operation with associated outputs, and connected with said voltage divider to be responsive to said oscillator output when said AC voltage drop is relatively high to be switched into said first mode of operation with one associated output, and to be non-responsive to said oscillator output when said AC voltage drop is relatively low to be switched into said second mode of operation with a second associated output.

Further, the loop circuit in which the first and second windings are connected includes switch means at one reference telephony station to open and close the loop, and a DC source at another reference station, the switch means for example being operated by removal or replacement of a telephone receiver (OFF hook or ON hook).

In addition, the detector switching means may typically and simply comprise multiple transistors connected in sequential controlling relation between the detector voltage divider and the output of the switching means, whereby that output may assume different voltage levels in correspondence to the presence or absence of current in the loop.

These and other objects and advantages of the invention, as well as the details of an illustrative embodiment, will be more fully understood from the following description and drawings.

DETAILED DESCRIPTION

In the drawing, a saturable core reactor 10 has first, second and third windings 11-13 which may for example be wound on an EI laminated core. The first and second windings 11 and 12 are adapted to be connected in a circuit to pass DC current. One such circuit includes leads 14, 14a 15 and 15a connected with such windings, as shown. Such a pair of leads may typically consist of subscriber telephone wires normally carrying voice frequencies between two reference stations 16 and 17, as for example a central office and a subscriber set. In that case, the windings 11-13 are such as not to adversely attenuate or otherwise affect voice frequencies in the wire pair, and they must pass relatively high AC voltage used to ring a telephone set.

Leads 14, 14a, 15 and 15a are connected in a loop, as shown, with a DC source such as battery 18 at reference station 16 and ganged switches $S_1$ and $S_2$ in the loop at reference station 17. A reference resistor $R_{ref}$ is also connected in the loop at station 17, between the switches. When the switches $S_1$ and $S_2$ are closed, the loop passes DC current through the windings 11 and 12, AC voltage input terminals are shown at 20 and 21 at station 16.

The reactor 10, connected as shown, together with the circuitry to be described, enables detection of the presence or absence of current in the described loop, and also provides a logic level indication. In accordance with the invention, resistance (such as $R_1$ for example) is connected with the third winding 13 to form a voltage divider; further, the output side 23a of an oscillator 23 is connected with the divider so that the AC voltage drop across the third winding 13 is relatively high when no DC current flows through the loop circuit leads 14, 14a, 15 and 15a, and the voltage drop is relatively low when DC current flows through the loop circuit. Merely as an example oscillator 23 may provide 20 KHZ output. In the example, series resistors $R_2$ and $R_3$ form a further voltage divider network connected to a point 24 between the resistor $R_1$ and winding 13. Note also that negative voltage is applied to divider terminals 26 and 28.

Referring again to the reactor 10, it is characterized in that the ratio of its inductance with no DC current through windings 11 and 12 to its inductance with more than about 20 milliamps for example through windings 11 and 12, is very large.

Further in accordance with the invention, switching means is provided to have first and second modes of operation, with associated outputs, one example of such switching means being shown at 27. It is connected with the voltage divider and with the oscillator output, as for example to junction 25, between resistors $R_2$ and $R_3$ to be responsive to the oscillator output when the aforementioned AC drop is relatively high to be switched into its first mode of operation with one associated output (i.e. first voltage level) at output terminal 29; and the switching means 27 is furthermore non-responsive to the oscillator output when the AC voltage drop across winding 13 is relatively low to be switched into its second mode of operation with a second associated output (i.e. second voltage level) at output terminal 29.

In the illustrated example 27 of the switching means, first, second and third semiconductor devices such as transistors $Q_1$, $Q_2$ and $Q_3$ are provided. The base 32 of $Q_1$ is connected with point 25 so that the first transistor $Q_1$ turns ON and OFF with each half cycle of the signal input. $C_1$ and $R_4$ connected in parallel between the collector 33 and ground 34 operate to filter the resultant collector current, creating a steady DC voltage, i.e. for example -14 volts, on the collector 33. Emitter 35 is connected to the voltage source, at terminal 26.

Collector 33 is connected via diode $D_1$ with the base 36 of $Q_2$. The collector 37 of $Q_2$ is connected via divider resistances $R_5$, $R_6$ and $R_7$, point 38 of the divider being connected with the base 39 of $Q_3$. $C_2$ is connected between divider point 40 and ground. The collector 41 of $Q_3$ is connected via resistance $R_8$ with the voltage source point 26. Emitter 42 of $Q_2$ is connected with point 26, and emitter 43 of $Q_3$ is connected to ground.

Under the above conditions, with $Q_1$ switching ON and OFF, $Q_2$ does not conduct, $Q_3$ does not conduct, and the output of the switching means at 29 is -14 volts, i.e. the same as the DC source. On the other hand, with $S_1$ and $S_2$ closed and loop current flowing in the pair 14 and 15, the conductance of the reactor is at a minimum, and no AC voltage appears across the center winding 13. $Q_1$ does not then conduct, $Q_2$ and $Q_3$ conduct, and the output at 29 is zero volts.

In the case of rotary dialing in a telephone circuit, switches $S_1$ and $S_2$ are opened and closed at a 10 pulse per second rate and 40% duty cycle. The circuit output during dialing remains constant due to the RC time constant of $R_5$, $R_6$ and $C_2$. This timing circuit provides enough current to $Q_3$ to keep it conducting for 150 milliseconds after current stops flowing in the loop. The inductance of the reactor, when saturated, is very low, and presents typically about 0.1 db insertion loss when used in telephony subscriber loops.

Typical values and identifications of described elements are listed as follows, these being typical only:

| | |
|---|---|
| $Q_1, Q_2$ | TIS97 |
| $Q_3$ | 2N4249 |
| $D_1$ | 1N914 |
| $R_{ref}$ | 2.4K |
| $R_1$ | 1K |
| $R_2$ | 10K |
| $R_3$ | 51K |
| $R_4$ | 150K |
| $R_5$ | 18K |
| $R_6$ | 100K |
| $R_7$ | 5.1K |
| $R_8$ | 100K |
| $C_1$ | .047 μf |
| $C_2$ | 1.0 μf |

We claim:

1. In a loop current detector,
   a. a saturable reactor having first, second and third windings, the first and second windings connected in a loop circuit to pass DC current,
   b. resistance connected with the third winding to form therewith a voltage divider, and an oscillator having an AC output connected with the divider, characterized in that the AC voltage drop across the third winding is relatively high when no DC current flows through said loop circuit, and said drop is relatively low when DC current flows through said circuit, and
   c. switching means having first and second modes of operation with associated outputs, and connected with said voltage divider to be responsive to said oscillator output when said AC voltage drop is relatively high to be switched into said first mode of operation with one associated output, and to be non-responsive to said oscillator output when said AC voltage drop is relatively low to be switched into said second mode of operation with a second associated output, said switching means including semiconductor devices one of which is connected with said divider at a point between said resistance and said third winding, there also being a source of DC voltage connected with said divider and said switching means to establish said one output at a corresponding voltage level,
   d. one portion of said loop circuit connected with certain ends of the first and second windings and another portion of the loop circuit connected with other ends of the first and second windings, the loop circuit including switch means in said one portion of the loop to open and close said circuit, and a DC source in said other portion of the loop.

2. The detector of claim 1 wherein said switching means is connected with said divider at a point between said resistance and said third winding, there also being a source of DC voltage connected with said divider, and said switching means to establish said one output at a corresponding voltage level.

3. In a loop current detector,
   a. a saturable reactor having first, second and third windings, the first and second windings adapted to be connected in a loop circuit to pass DC current,
   b. resistance connected with the third winding to form therewith a voltage divider, and an oscillator having an AC output connected with the divider, characterized in that the AC voltage drop across the third winding is relatively high when no DC current flows through said loop circuit, and said drop is relatively low when DC current flows through said circuit, and
   c. switching means having first and second modes of operation with associated outputs, and connected with said voltage divider to be responsive to said oscillator output when said AC voltage drop is relatively high to be switched into said first mode of operation with one associated output, and to be non-responsive to said oscillator output when said AC voltage drop is relatively low to be switched into said second mode of operation with a second associated output, said switching means being connected with said divider at a point between said resistance and said third winding, there also being a source of DC voltage connected with said divider, and said switching means to establish said one output at a corresponding voltage level,
   d. said switching means comprising first, second and third transistors each having base, collector and emitter electrodes, the first transistor electrically connected in controlling relation with the second transistor which is electrically connected in controlling relation with the third transistor, the first transistor base connected with said point so that the first transistor switches ON and OFF for preventing conduction of the second and third transistors when said AC voltage drop at the third winding is relatively high, and so that the first transistor is turned off for permitting conduction of the second and third transistors when said AC voltage drop is at a relatively low value.

4. The detector of claim 1 wherein said one device is coupled with another of said devices so that the first device switches ON and OFF for preventing conduction of at least the other device when said AC voltage drop at the third winding is relatively high, and so that the first device permits conduction of at least the other device when said AC voltage drop is at a relatively low value.

5. The detector of claim 1 including AC terminals respectively connected with said certain ends of the first and second windings.

6. The detector of claim 3 wherein said source of DC voltage is connected with the emitter-collector circuit of each of said transistors, and also with the switching means output.

* * * * *